US008068811B2

(12) United States Patent
Takamune

(10) Patent No.: US 8,068,811 B2
(45) Date of Patent: Nov. 29, 2011

(54) MOBILE COMMUNICATION TERMINAL DEVICE

(75) Inventor: Akira Takamune, Tokyo (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 1155 days.

(21) Appl. No.: 11/495,537

(22) Filed: Jul. 31, 2006

(65) Prior Publication Data

US 2007/0268789 A1 Nov. 22, 2007

(30) Foreign Application Priority Data

May 18, 2006 (JP) ................................. 2006-139226

(51) Int. Cl.
*G06F 21/24* (2006.01)
*G06Q 50/00* (2006.01)
*H04L 9/32* (2006.01)
(52) U.S. Cl. ...................... 455/410; 455/418; 455/26.1
(58) Field of Classification Search .................. 455/410, 455/411
See application file for complete search history.

(56) References Cited

U.S. PATENT DOCUMENTS

| 6,064,880 | A | * | 5/2000 | Alanara | 455/419 |
| 6,216,014 | B1 | * | 4/2001 | Proust et al. | 455/558 |
| 6,985,719 | B2 | * | 1/2006 | Leppinen et al. | 455/412.1 |
| 7,620,385 | B2 | * | 11/2009 | Tsampalis et al. | 455/410 |
| RE41,546 | E | * | 8/2010 | Vainstein | 705/57 |
| 2004/0203746 | A1 | * | 10/2004 | Knauerhase et al. | 455/432.1 |
| 2004/0253983 | A1 | * | 12/2004 | Vanhatalo et al. | 455/558 |
| 2006/0025177 | A1 | * | 2/2006 | Tu | 455/558 |
| 2006/0083207 | A1 | * | 4/2006 | Karimi et al. | 370/338 |
| 2006/0094419 | A1 | * | 5/2006 | Katou | 455/425 |
| 2006/0229063 | A1 | * | 10/2006 | Koch | 455/414.1 |
| 2006/0281407 | A1 | * | 12/2006 | Deeds | 455/41.2 |
| 2006/0286971 | A1 | * | 12/2006 | Maly et al. | 455/415 |
| 2007/0066288 | A1 | * | 3/2007 | Soelberg et al. | 455/415 |
| 2007/0207729 | A1 | * | 9/2007 | Chen et al. | 455/15 |
| 2007/0213034 | A1 | * | 9/2007 | Cai et al. | 455/412.1 |

FOREIGN PATENT DOCUMENTS

| JP | 2001-265638 A | 9/2001 |
| JP | 2002-033819 A | 1/2002 |
| JP | 2004-40283 | 2/2004 |
| JP | 2004-102465 A | 4/2004 |

OTHER PUBLICATIONS

Japanese Office Action mailed Mar. 29, 2011 in related application No. 2006-139226.

* cited by examiner

*Primary Examiner* — Rafael Pérez-Gutiérrez
*Assistant Examiner* — Frank Donado
(74) *Attorney, Agent, or Firm* — Maschoff Gilmore & Israelsen

(57) ABSTRACT

According to an embodiment of the invention, a mobile communication terminal device comprises: an information memory unit configured to store a first information and a security information indicating whether the first information is secret; a backup request memory unit configured to store a first request for backing up identification information of the first information and the first information, or a second request for deleting a second information identified by the identification information with which the first information is stored in the backup device; a transmitting unit configured to transmit the first request or the second request based on the information stored in the backup request memory unit; and a management unit configured to store the identification information of the first information and the first request, if the first information of which the security information indicates that the first information is not secret is stored in the information memory unit.

10 Claims, 9 Drawing Sheets

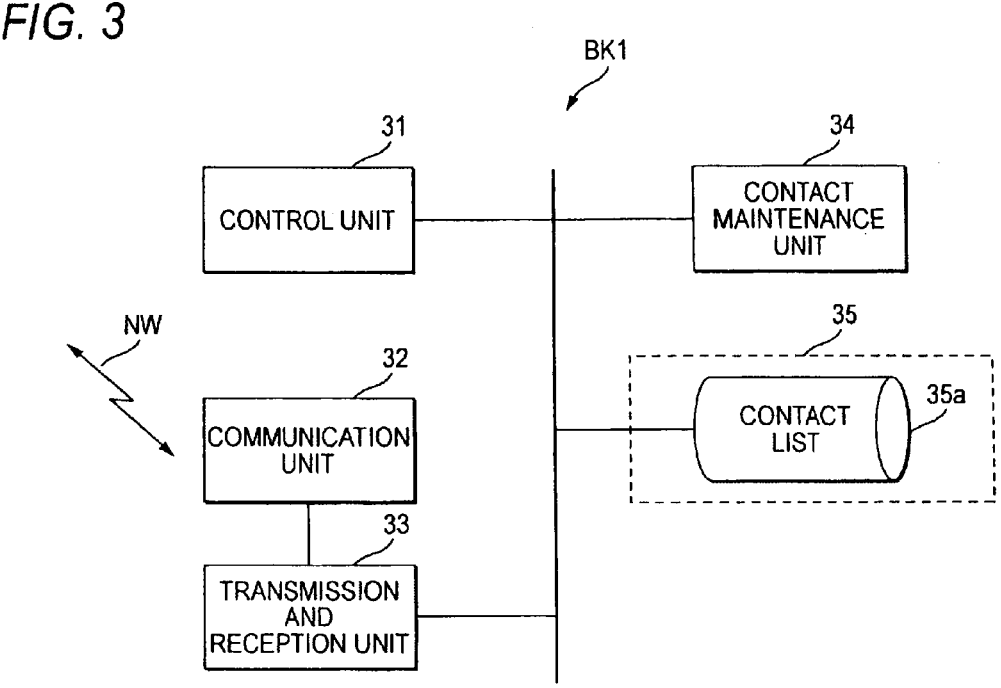

FIG. 5

| CONTACT ID | REQUEST TO FIRST BACKUP SERVER DEVICE | REQUEST TO SECOND BACKUP SERVER DEVICE | ... |
|---|---|---|---|
| 1 | ADD | ADD | |
| | | | |

FIG. 6

| CONTACT ID | REQUEST TO FIRST BACKUP SERVER DEVICE | REQUEST TO SECOND BACKUP SERVER DEVICE | ... |
|---|---|---|---|
| 2 | DELETE | DELETE | |
| | | | |

FIG. 7

| CONTACT ID | REQUEST TO FIRST BACKUP SERVER DEVICE | REQUEST TO SECOND BACKUP SERVER DEVICE | ... |
|---|---|---|---|
| 1 | ADD | ADD | |
| 3 | SYNCHRONIZED | ADD | |
| 4 | DELETE | – | |
| | | | |

… is one or more, and any of them backs up information stored in the

MOBILE COMMUNICATION TERMINAL DEVICE

CROSS-REFERENCE TO RELATED APPLICATION

This application is based on and claims the benefit of priority from the prior Japanese Patent Application No. 2006-139226, filed on May 18, 2006; the entire contents of which are incorporated herein by reference.

BACKGROUND

1. Technical Field

The present invention relates to a mobile communication terminal device, and more particularly, to backing up information stored in a device.

2. Description of Related Art

Information such as address lists, schedules, memo pads, and electronic mails is stored in an information memory unit of a mobile communication terminal device. When a user of the mobile communication terminal device erroneously treats the information, for example, deletes or changes the information, a backing-up of the information in a server device is performed so as to restore the information to the state before the treatment. When the information stored in the mobile communication terminal device is changed, that is, added, modified, or deleted, the changed information is backed up in the server device and the information stored in the server device is maintained equivalent to the information stored in the mobile communication terminal device.

All the information stored in the mobile communication terminal device may be not backed up. Only a part of the information may be backed up in accordance with an instruction from the user of the mobile communication terminal device. For example, there is known a process of classifying information into two kinds depending upon the importance thereof and backing up only important information (see a description of JP-A-2004-40283 at page 8 and FIG. 7).

SUMMARY

However, according to JP-A-2004-40283, a process of setting operation modes of the device and a backup operation based on the kind into which the information is classified are not clear. For example, the backup operation when an operation mode indicating whether different kinds of information are treated in the same way is changed is not clear.

The present invention has been made in view of the above circumstances and provides a mobile communication terminal device. According to an aspect of the invention, a mobile communication terminal device can set an operation mode of a device and perform a backup operation based on the kind into which information is classified.

According to another aspect of the invention, a mobile communication terminal device connectable to a backup device backing up information through a communication network, comprises: an information memory unit configured to store a first information and a security information indicating whether the first information is secret or not; a backup request memory unit configured to store a first request for backing up identification information of the first information stored in the information memory unit and the first information in the backup device, or a second request for deleting a second information identified by the identification information with which the first information is stored in the backup device; a transmitting unit configured to transmit the first request or the second request based on the information stored in the backup request memory unit; and a management unit configured to store the identification information of the first information and the first request, if the first information of which the security information indicates that the first information is not secret is stored in the information memory unit.

BRIEF DESCRIPTION OF THE DRAWINGS

These and other objects and advantages of this invention will become more fully apparent from the following detailed description taken with the accompanying drawings in which:

FIG. 3 is an exemplary block diagram illustrating a configuration of a first backup device according to the embodiment;

FIG. 4 is a diagram illustrating an exemplary structure of a contact list of a mobile communication terminal device according to the embodiment;

FIG. 5 is a diagram illustrating an exemplary structure of a backup request according to the embodiment (first example);

FIG. 6 is a diagram illustrating another exemplary structure of a backup request according to the embodiment (second example);

FIG. 7 is a diagram illustrating another exemplary structure of a backup request according to the embodiment (third example);

DESCRIPTION OF THE EMBODIMENTS

Figure 1:
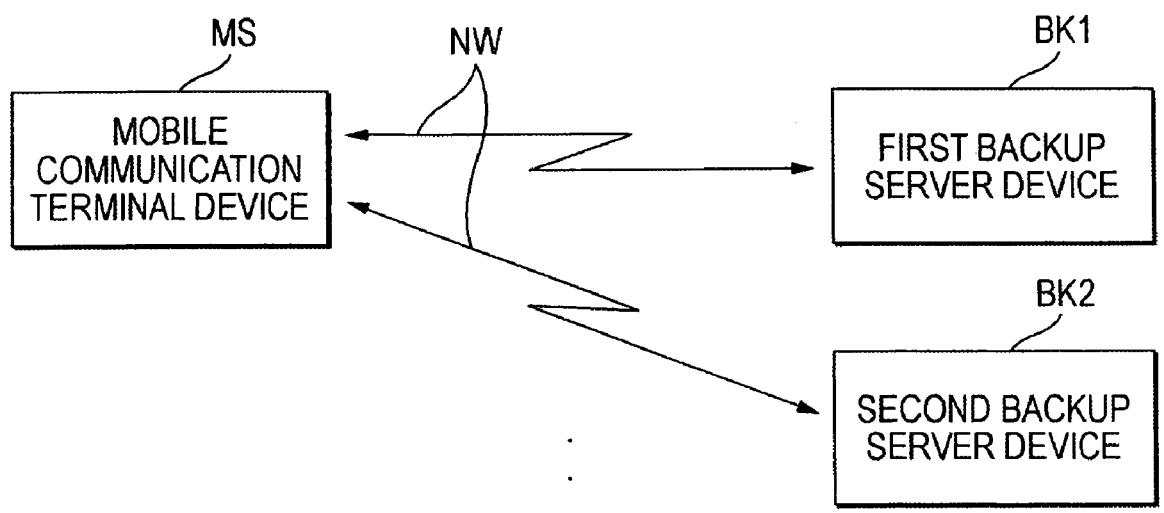
FIG. 1 is an exemplary block diagram illustrating a configuration of a backup system according to an embodiment of the present invention.

Hereinafter, a mobile communication terminal device according to an embodiment of the invention will be described with reference to the drawings. FIG. 1 is a block diagram illustrating a configuration of a backup system. The backup system includes a mobile communication terminal device MS according to the embodiment, a first backup server device BK1, a second backup server device BK2, . . . .

The mobile communication terminal device MS is connected to the first backup server device BK1, the second backup server device BK2, . . . through a communication network NW. Here, the total number of the first backup server device BK1, the second backup server device BK2, . . . is one or more, and any of them backs up information stored in the mobile communication terminal device MS. The communication network NW is a communication network partially including a cellular network.

Figure 2:
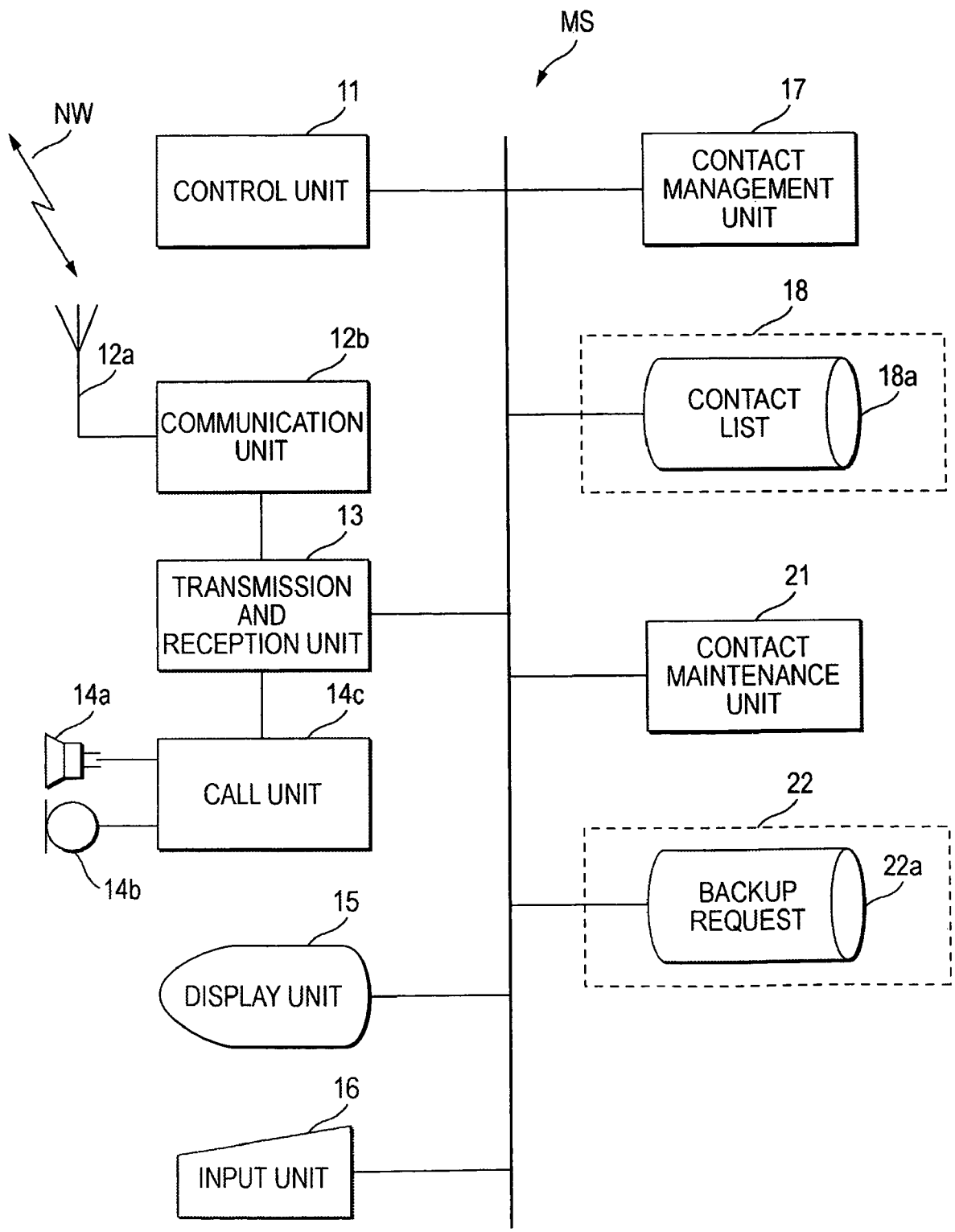
FIG. 2 is an exemplary block diagram illustrating a configuration of a mobile communication terminal device according to the embodiment.

FIG. 2 is a block diagram illustrating a configuration of the mobile communication terminal device MS. The mobile communication terminal device MS includes a control unit 11 controlling the entire device, an antenna 12a transmitting and receiving electromagnetic waves through the communication networks NW, a communication unit 12b, a transmission and reception unit 13, a call speaker 14a, a call microphone 14b, a call unit 14c, a display unit 15, an input unit 16, a contact management unit 17, a contact memory unit 18, a contact maintenance unit 21, and a backup request memory unit 22.

The contact memory unit 18 stores a contact list 18a. The backup request memory unit 22 stores a backup request 22a.

FIG. 3 is a block diagram illustrating a configuration of the first backup server device BK1. The first backup server device BK1 includes a control unit 31 controlling the entire device, a communication unit 32 for performing a communication through the communication network NW, a transmission and reception unit 33, a contact maintenance unit 34, and a contact memory unit 35. The contact memory unit 35 stores a contact list 35a.

The configurations of the second backup server device BK2, . . . are similar to the configuration of the first backup server device BK1 and thus description thereof will be omitted.

Operations of the units of the mobile communication terminal device according to the embodiment and operations of the first backup server device BK1, the second backup server device BK2, . . . are described with reference to FIGS. 2 and 3.

The communication unit 12b outputs RF signals received through the antenna 12a to the transmission and reception unit 13, and transmits RF signals output from the transmission and reception unit 13 through the antenna 12a.

The transmission and reception unit 13 amplifies, frequency-converts, and demodulates the RF signal from the communication unit 12b, sends the resultant digital voice signal to the call unit 14c, and sends a control signal to the control unit 11. The transmission and reception unit 13 obtains an RF signal by modulating, frequency-converting, and amplifying the digital voice signal output from the call unit 14c and the control signal output from the control unit 11, and sends the RF signal to the communication unit 12b.

The call unit 14c converts the digital voice signal output from the transmission and reception unit 13 into an analog voice signal, amplifies the analog voice signal, and sends the amplified analog voice signal to the speaker 14a. The call unit 14c amplifies the analog voice signal output from the microphone 14b, converts the analog voice signal into a digital voice signal, and sends the digital voice signal to the transmission and reception unit 13.

The display unit 15 displays image data of characters or numerals including a cursor under the control of the control unit 11. The displayed data are switched by receiving an instruction from the control unit 11 in response to the input manipulation of the input unit 16.

The input unit 16 specifies the phone number or the like of the opposite party and includes keys such as numeral keys for inputting hiragana characters, alphabet characters, and symbol characters using a toggle input method and functional keys including cursor moving keys and scroll keys. When a key of the input unit 16 is pressed, an ID of the key is notified to the control unit 11, a character is displayed on the display unit 15 by the control unit 11, the character is notified to the respective units, and is under the control.

The contact management unit 17 is activated by the control unit 11 in response to manipulation of a predetermined key of the input unit 16 so as to manage the contact list 18a. Here, the contact list 18a includes information such as names and phone numbers, as described later.

That is, when a predetermined key of the input unit 16 is manipulated, the contact management unit 17 searches out information stored in the contact list 18a, displays the searched-out information on the display unit 15, corrects and deletes the displayed information, and then stores the information in the contact list 18a. The contact management unit 17 additionally stores new information in the contact list 18a. The contact management unit 17 sends the phone number of the searched-out information to the control unit 11 and sends a call to the phone number.

The contact management unit 17 stores information for identifying data, which are all or a part of the contact list 18a, to be backed up as a backup request 22a in the backup request memory unit 22, and stores information for identifying the backed-up data to be deleted as a backup request 22a in the backup request memory unit 22.

Here, in the backup request 22a, the information for identifying data to be backed up and the information for identifying the backed-up data to be deleted are taken in order, details of which are described later.

The contact maintenance unit 21 transmits a contact to the first backup server device BK1, the second backup server device BK2, . . . in response to the backup request 22a taken in order and stored in the backup request memory unit 22 so as to back up the contact therein, and deletes the contact backed up in the first backup server device BK1, the second backup server device BK2, . . . . Herein, the contact comprises information associated with a name, a telephone number, a mail address, an affiliation, a group, a photograph, etc.

When a predetermined key of the input unit 16 is manipulated, the contact maintenance unit 21 allows the contact stored in the first backup server device BK1, the second backup server device BK2, . . . to be transmitted, receives the transmitted contact, and stores the received contact in the contact list 18a of the contact memory unit 18.

The communication unit 32 outputs a signal received from the communication network NW to the transmission and reception unit 33 and transmits the signal output from the transmission and reception unit 33 to the communication network NW.

The transmission and reception unit 33 amplifies and demodulates a signal from the communication unit 32 and sends the resultant digital signal to the control unit 31. The transmission and reception unit 33 modulates and amplifies a signal output from the control unit 31 and sends the resultant signal to the communication unit 32.

The contact maintenance unit 34 stores the contact transmitted from the mobile communication terminal device MS in the contact list 35a of the contact memory unit 35 or deletes the contact from the contact list, in response to a request transmitted from the mobile communication terminal device MS and received by the transmission and reception unit 33. The contact maintenance unit 34 transmits a part or all of the contact list 35a stored in the contact memory unit 35 to the mobile communication terminal device MS.

Operations of the units constituting the second backup server device BK2, . . . are similar to the operations of the units of the first backup server device BK1 and thus description thereof will be omitted.

Hereinafter, operations for securing information which are performed by the mobile communication terminal device MS according to the embodiment, the first backup server device BK1, the second backup server device BK2, ... are described with reference to FIGS. 2 to 13.

FIG. 4 shows an example of a structure of the contact list 18a stored in the contact memory unit 18. The contact list 18a includes one or more contacts and each contact includes a contact ID 18b, a name 18c, a phone number 18d, and a secret attribute 18e. The contact ID 18b is an ID for uniquely identifying the contact included in the contact list 18a and is, for example, a locally unique identifier (LUID), but is not limited to the LUID.

The name 18c is information for allowing a user to identify the contact, such as a name of a person or a name of a company. The phone number 18d is a phone number of the name 18c. The secret attribute 18e has a value of "OFF" or "ON." When the secret attribute has the value of "OFF", it indicates that the contact is not secret (that is, middle security). When the secret attribute has the value of "ON", it indicates that the contact is secret (that is, high security). The contact of which the secret attribute 18e has the value of "ON" may not be displayed or may not be backed up as described later.

FIG. 5 shows an example of a structure of the backup request 22a stored in the backup request memory unit 22 and FIGS. 6 and 7 show other examples of the structure of the backup request 22a. The backup request 22a is a request in which the contact ID 22b, the request 22c to the first backup server device, the request 22d to the second backup server device, ... are correlated with each other. The contact ID 22b corresponds to the contact ID 18b, and the request indicates a request for a contact in the contact list 18a identified by the contact ID 18b.

The request 22c to the first backup server device has one of "ADD", "DELETE", and "SYNCHRONIZED" or has no information (indicated by "-" in FIG. 7). The "ADD" indicates a request for backing up the contact identified by the contact ID 22b in the first backup server device BK1. The "DELETE" indicates a request for deleting information on the contact identified by the contact ID 22b and backed up in the first backup server device BK1.

The "SYNCHRONIZED" indicates that the request of "ADD" or "DELETE" is executed. When no information is written (indicated by "-" in FIG. 7), it means that no request to the first backup server device BK1 exists.

The request 22d to the second backup server device, ... are similar to the request 22c to the first backup device, except that it is the request to the second backup server device BK2, and thus description thereof will be omitted. When the request 22c to the first backup server device, the request 22d to the second backup server device, ... have "SYNCHRONIZED" or no information, it means that all the requests for the contact identified by the contact ID 22b are executed, and the information is deleted from the backup request 22a.

As described later, the backup request 22a shown in FIG. 5 is one example of a backup request 22a prepared when two contacts shown in FIG. 4 are newly stored in the contact list 18a, and indicates a request for backing up a contact (the secret attribute 18e is "OFF") of which the contact ID 18b is "1."

The backup request 22a shown in FIG. 6 is a request for deleting a contact of which the contact ID 18b is "2" (the secret attribute 18e is "ON") after two contacts shown in FIG. 4 are backed up. The backup request 22a shown in FIG. 7 is not necessarily correlated with the example of the contact list 18a shown in FIG. 4, but is an example for explaining types of a variety of requests.

Figure 8:
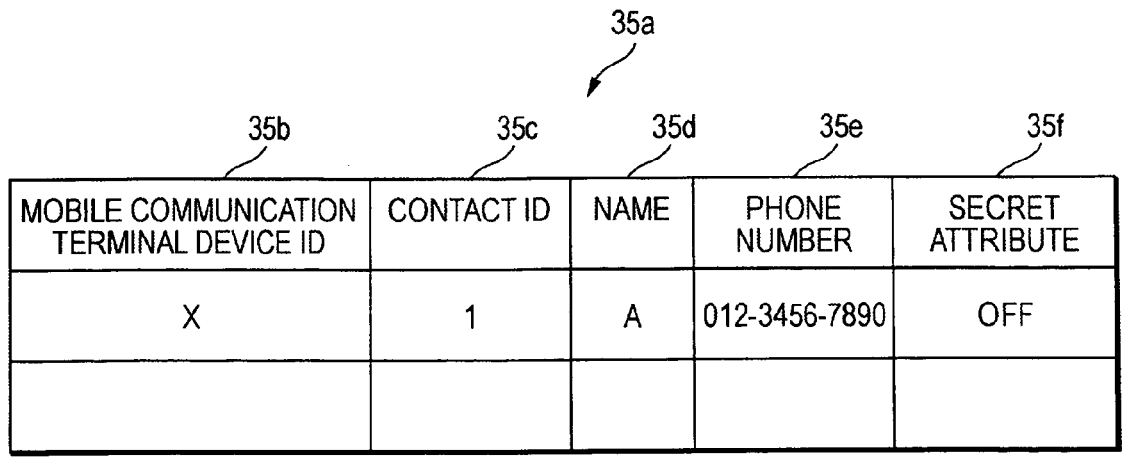
FIG. 8 is a diagram illustrating an exemplary structure of a contact list of a first backup device according to the embodiment.

FIG. 8 shows an example of a configuration of the contact list 35a stored in the contact memory unit 35. The contact list 35a includes one or more contacts and each contact includes a mobile communication terminal device ID 35b, a contact ID 35c, a name 35d, a phone number 35e, and a secret attribute 35f.

The mobile communication terminal device ID 35b is information for uniquely identifying the mobile communication terminal device MS having transmitted to a contact to be backed up. An example of the information is a global unique identifier (GUID), but the information is not limited to it. The contact ID 35c, the name 35d, the phone number 35e, and the secret attribute 35f are the contact ID 18b, the name 18c, the phone number 18d, and the secret attribute 18e in the contact list 18a of the mobile communication terminal device MS identified by the mobile communication terminal device ID 35b, respectively, and are transmitted for a backup thereof.

As described later, the contact list 35a shown in FIG. 8 illustrates an example in which a part (a contact of which the contact ID 18b is "1") of the contact list 18a shown in FIG. 4 is backed up in response to the backup request 22a shown in FIG. 5.

Operations for the backup operation of the contact management unit 17 will be described. Operations not relating to the backup operation are widely known and thus will be described in brief. The contact management unit 17 switches a secret mode between an ON state and an OFF state in response to manipulation of a predetermined key of the input unit 16 and operates in the set state. In order to set a secret mode to the ON state, authentication is performed by using predetermined authentication information for confirming an authorized user. If the secret mode is in the ON state, it means that the secret information can be accessed even if the secret attribute 18e of the contact is "ON".

That is, when the secret mode is in the OFF state, the contact management unit 17 operates to display a contact of which the secret attribute 18e in the contact list 18a is "OFF" on the display unit 15 and to back up the contact in the first backup server device BK1, the second backup server device BK2, ... as described later.

On the other hand, when the secret mode is in the ON state, the contact management unit 17 operates to display all the contacts of the contact list 18a on the display unit 15 whether the secret attribute 18e is "ON" or "OFF" and to back up all the contacts in the first backup server device BK1, the second backup server device BK2, ....

Figure 9:
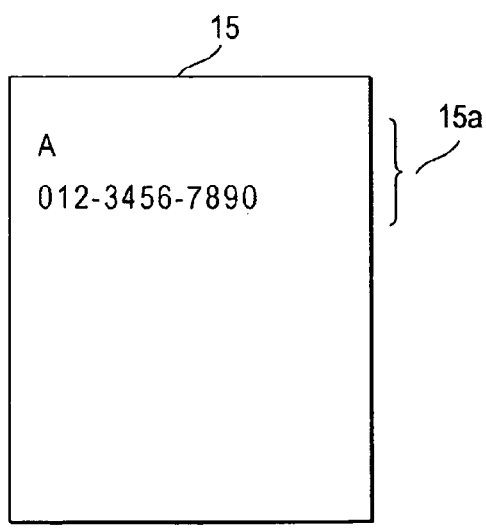
FIG. 9 is an exemplary diagram illustrating a contact list displayed on a display unit by a contact management unit according to the embodiment (first example)

For example, when the secret mode is in the OFF state at the time of displaying the contact list 18a shown in FIG. 4, the contact management unit 17 displays a contact view 15a including "A" as the name 18c and "012-3456-7890" as the phone number 18d of a contact of which the secret attribute 18e is "OFF", as shown in FIG. 9. The contact management unit 17 does not display the information of a contact of which the secret attribute 18e is "ON" and the name 18c is "B."

Figure 10:
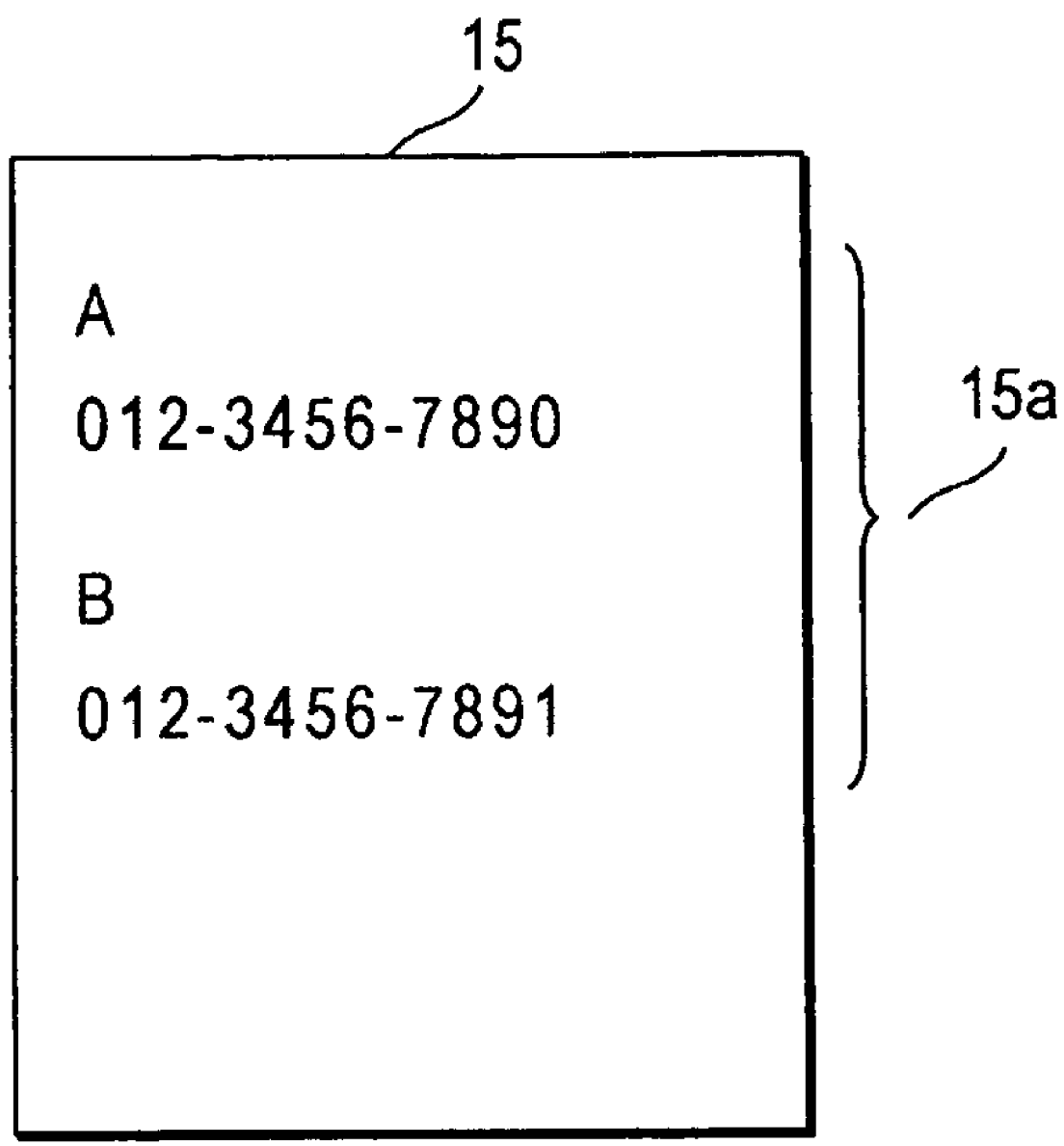
FIG. 10 is an exemplary diagram illustrating a contact list displayed on a display unit by a contact management unit according to the embodiment (second example)

On the other hand, when the secret mode is in the ON state, the contact management unit 17 displays a contact view 15a including "A" as the name 18c and "012-3456-7890" as the phone number 18d of a contact of which the secret attribute 18e is "OFF" and "B" as the name 18c and "012-3456-7891" as the phone number 18d of a contact of which the secret attribute 18e is "ON", as shown in FIG. 10.

Figure 11:
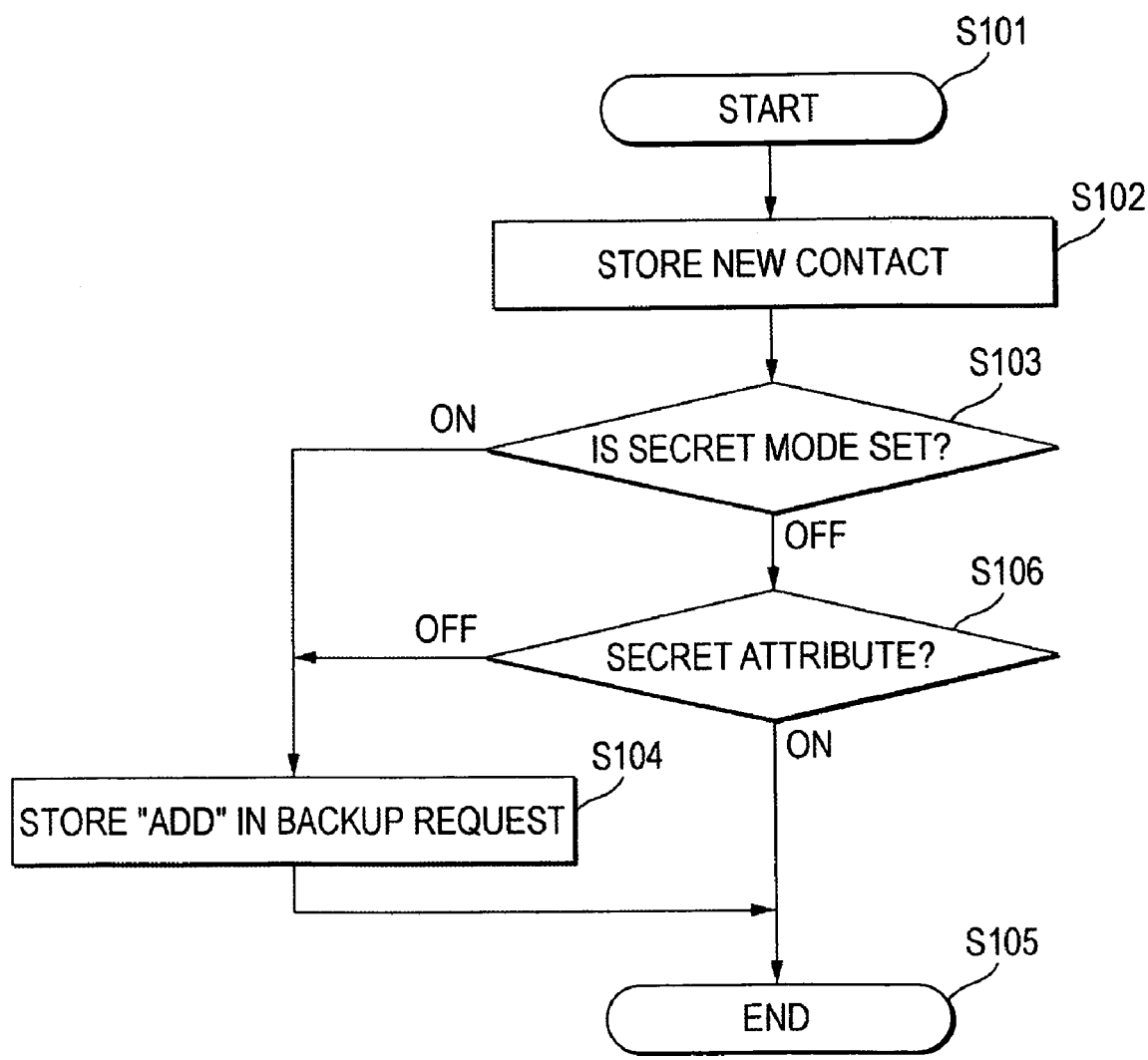
FIG. 11 is an exemplary flowchart illustrating an operation of a contact management unit according to the embodiment (an operation when a contact is newly added)

An operation of allowing the contact management unit 17 to add the contact to the contact list 18a will be described. FIG. 11 shows a flowchart of an operation of allowing the contact management unit 17 to add the contact to the contact list 18a. The contact management unit 17 is activated in response to the manipulation of a predetermined key of the input unit 16 (step S101) and additionally stores the name 18c, the phone number 18d, and the secret attribute 18e in the contact list 18*a* in response to the key manipulation of the input unit 16. At this time, the contact management unit 17 marks the additionally stored contact with a uniquely identifying value as the contact ID 18*b* (step S102). The contact ID 18*b* previously used may not be used as the contact ID 18*b*.

The contact management unit 17 checks the current secret mode (step S103). When the secret mode is in the ON state, the contact management unit 17 backs up the additionally stored contact. Accordingly, the contact management unit 17 adds to the backup request 22*a* information in which the marked contact ID 18*b* is set as a contact ID 22*b* and "ADD" is set as the request 22*c* to the first backup server device, the request 22*d* to the second backup server device, . . . (step S104), and then ends the operation (step S105).

On the other hand, when the secret mode is in the OFF state, the contact management unit 17 checks the secret attribute 18*e* (step S106). When the secret attribute 18*e* is "OFF", the contact management unit 17 adds the information to the backup request 22*a* (step S104) as described above, and then ends the operation (step S105). On the other hand, when the secret attribute 18*e* is "ON", the contact management unit 17 ends the operation (step S105).

In other words, if the secret mode is in the OFF state and the secret attribute 18*e* is "ON", it means that it is an operation mode in which the access to the secret information is not permitted and that the additionally stored contact is secret information. Accordingly, the contact management unit 17 performs an operation not including the backup operation.

When a contact of which the contact ID 18*b* shown in FIG. 4 is "1" is added, the backup request 22*a* shown in FIG. 5 is prepared in step S104.

Next, an operation of allowing the contact management unit 17 to delete the contact from the contact list 18*a*. The contact management unit 17 deletes the contact from the contact list 18*a* and then checks whether the contact is backed up. As described above, when the secret mode is in the ON state or when the secret attribute 18*e* is "OFF", the contact is backed up.

In this case, in order to delete the backed-up contact, the contact management unit 17 adds to the backup request 22*a* information in which the contact ID 18*b* of the deleted contact is set as a contact ID 22*b* and "DELETE" is set as the request 22*c* to the first backup server device, the request 22*d* to the second backup server device, . . . and ends the operation.

However, when the information in which the contact ID 18*b* of the deleted contact is set as a contact ID 22*b* and "ADD" is set as the request 22*c* to the first backup server device, the request 22*d* to the second backup server device, . . . , the backup operation is not ended. Accordingly, the contact management unit 17 does not perform the backup operation by deleting the request for backup from the backup request 22*a*.

As described above, when the contact of which the contact ID 18*b* shown in FIG. 4 is "2" is deleted, the backup request 22*a* shown in FIG. 6 is prepared in the operation.

Next, an operation of the contact management unit 17 when the secret mode is switched from the ON state to the OFF state will be described.

Figure 12:
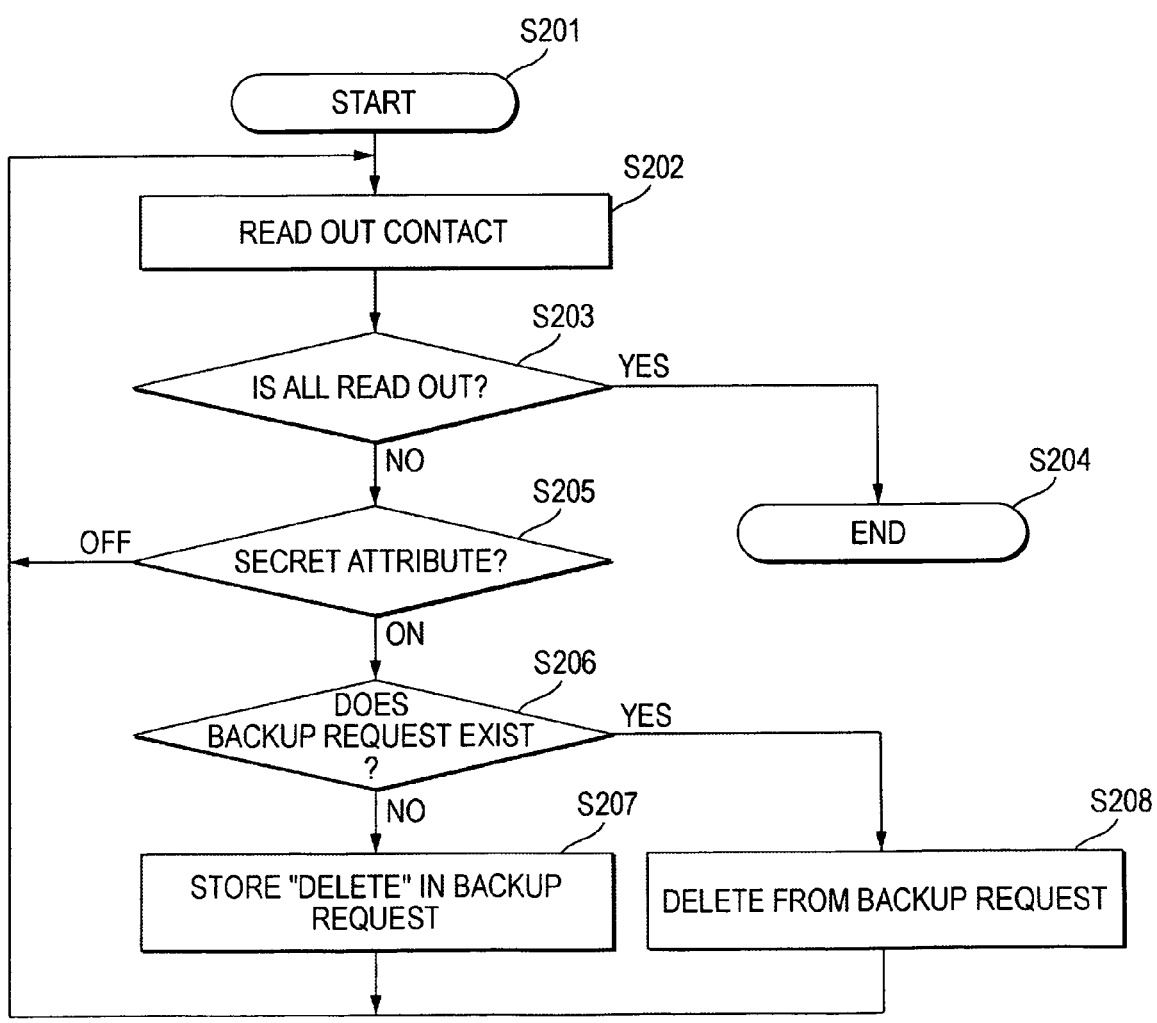
FIG. 12 is an exemplary flowchart illustrating an operation of a contact management unit according to the embodiment (an operation when a secret mode is switched to an OFF state)

FIG. 12 is a flowchart illustrating an operation of the contact management unit 17 when the secret mode is switched from the ON state to the OFF state. The contact management unit 17 starts its operation with the switching of the secret mode 17 (step S201). The contact management unit 17 sequentially reads out the contacts from the contact list 18*a* (step S202) and checks whether all the contacts are read out or not (step S203).

When all the contacts are read out, the contact management unit 17 ends the operation (step S204). On the other hand, when all the contacts are not read out, the contact management unit 17 checks the secret attribute 18*e* of a read-out contact (step S205). When the secret attribute 18*e* is "OFF", the contact management unit 17 performs the process of reading out the contact in step S202.

On the other hand, when the secret attribute 18*e* is "ON", the contact management unit 17 checks whether the information in which the contact ID 18*b* of the read-out contact is set as a contact ID 22*b* and "ADD" is set as the request 22*c* to the first backup server device, the request 22*d* to the second backup server device, . . . is included in the backup request 22*a* (step S206).

When the information is not included therein, the contact identified by the contact ID 18*b* has been already backed up. Accordingly, the contact management unit 17 deletes the backed-up contact. Therefore, the contact management unit 17 adds to the backup request 22*a* the information in which the contact ID 18*b* of the read-out contact is set as a contact ID 22*b* and "DELETE" is set as the request 22*c* to the first backup server device, the request 22*d* to the second backup server device, . . . (step S207) and performs the process of reading out the contact in step S201.

On the other hand, when the information is included therein, the contact identified by the contact ID 18*b* has not been backed up. Accordingly, the contact management unit 17 deletes, from the backup request 22*a*, the information in which the contact ID 18*b* of the included and read-out contact is set as a contact ID 22*b* and "ADD" is set as the request 22*c* to the first backup server device, the request 22*d* to the second backup server device, . . . (step S208) and performs the process of reading out the contact in step S201 without performing the backup operation.

When "ADD" is stored in one of the request 22*c* to the first backup server device, the request 22*d* to the second backup server device, . . . , the contact management unit 17 deletes the information on the included contact and does not back up the information. The contact management unit 17 stores "DELETE" for the not-included contact and deletes the backed-up information.

Through the above-mentioned operation, the contact of which the secret attribute 18*e* is "ON" can be accessed when the secret mode is in the ON state, and is backed up. Accordingly, when the secret mode is switched to the OFF state, the contact management unit 17 can delete the backed-up information stored in the first backup server device BK1, the second backup server device BK2, . . . . When the information is not backed up, the contact management unit 17 does not uselessly perform a backup of the information and a deletion of the backed-up information.

Next, an operation of the contact management unit 17 when the secret mode is switched from the OFF state to the ON state will be described. When the secret mode is switched to the ON state, the contact management unit 17 has already back up all the contacts. However, since the contact of which the secret attribute 18*e* is "OFF" is already backed up, the operation is not performed.

That is, as for a contact of which the secret attribute 18*e* is "ON", the contact management unit 17 adds to the backup request 22*a* the information in which the contact ID 18*b* of the contact is set as the contact ID 22*b* and "ADD" is set as the request 22*c* to the first backup server device, the request 22*d* to the second backup server device, . . . .

However, when the information in which the contact ID 18*b* of the contact is set as the contact ID 22*b* and "DELETE" is set as the request 22*c* to the first backup server device, the request 22*d* to the second backup server device, . . . is included in the backup request 22*a*, it means that the contact is already backed up. Accordingly, the contact management unit 17 deletes the information from the backup request 22*a*.

Figure 13:
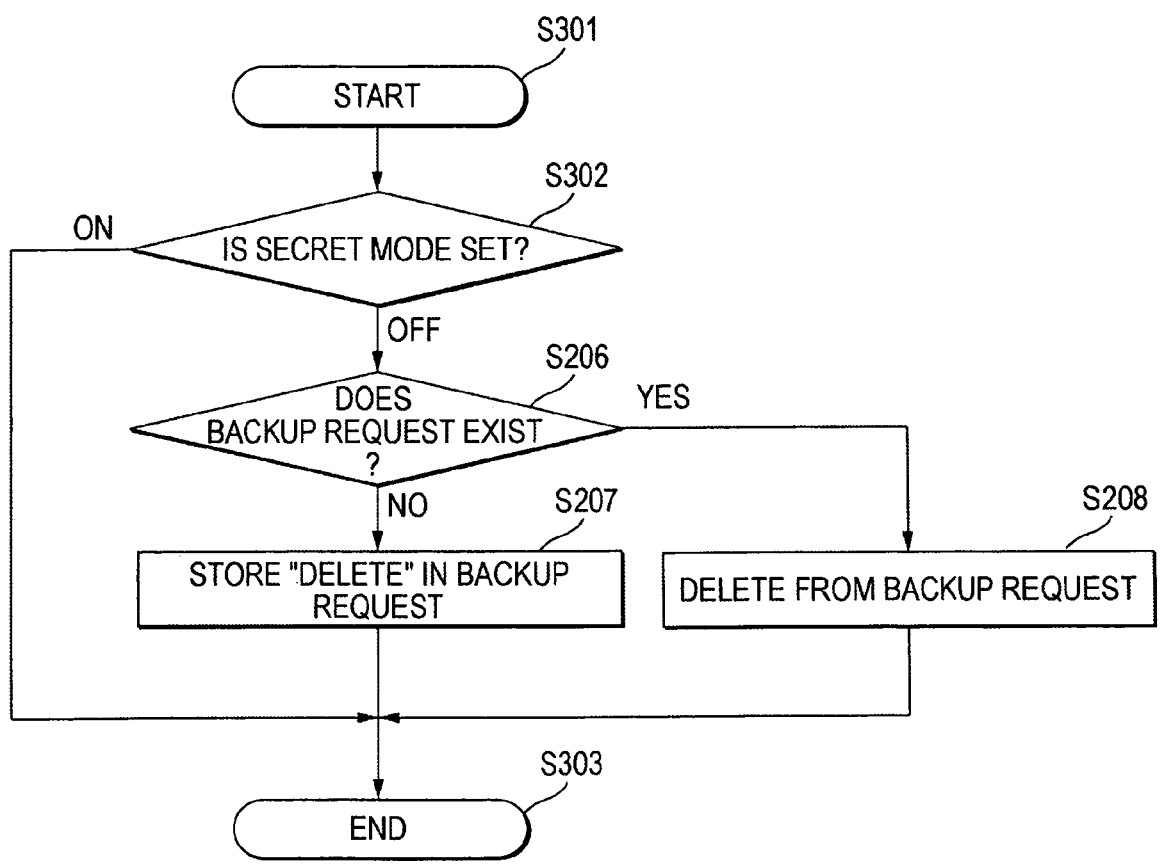
FIG. 13 is a flowchart illustrating an operation of a contact management unit according to the embodiment (an operation when a secret attribute is changed to an ON state.

Next, an operation of the contact management unit 17 when the secret attribute 18*e* of a contact is changed will be described. FIG. 13 is a flowchart illustrating the operation of the contact management unit 17 when the secret attribute 18*e* is changed from "OFF" to "ON." The operation of the contact management unit 17 when the secret attribute 18*e* of a contact is changed from "OFF" to "ON" is similar to the operation of the contact management unit 17 when the secret mode is switched from the ON state to the OFF state, as described with reference to the flowchart of FIG. 12. Accordingly, the same steps are denoted by the same reference numerals and description thereof will be omitted.

When the secret attribute 18*e* of a contact is changed from "OFF" to "ON" by means of predetermined manipulation of the input unit 16, the contact management unit 17 starts the operation (step S301) and checks whether the secret mode is in the ON state or in the OFF state (step S302). When the secret mode is in the ON state, the contact is backed up regardless of the secret attribute 18*e* of the contact. Accordingly, the contact management unit 17 ends the operation without performing the backup operation (step S303).

On the other hand, when the secret mode is in the OFF state, the contact management unit 17 performs the operations of steps S206 to S208 described above and ends the operation without backing up the contact (step S303).

Next, when the secret attribute 18*e* of a contact is changed from "ON" to "OFF", that is, when the contact is not secret, the contact management unit 17 checks the secret mode at that time. When the secret mode is in the ON state, the contact is backed up regardless of the secret attribute 18*e* of the contact. Accordingly, the contact management unit 17 does not perform the operation relating to the backup operation.

On the other hand, when the secret mode is in the OFF state, a backing-up of the contact is performed. Accordingly, the contact management unit 17 performs the same operation as the operation of step S104 in the flowchart shown in FIG. 11 and then adds to the backup request 22*a* the information in which the contact ID 18*b* of the contact is set as the contact ID 22*b* and "ADD" is set as the request 22*c* to the first backup server device, the request 22*d* to the second backup server device, . . . .

However, when the information in which the contact ID 18*b* of the contact is set as the contact ID 22*b* and "DELETE" is set as the request 22*c* to the first backup server device, the request 22*d* to the second backup server device, . . . is stored in the backup request 22*a*, the contact is already backed up. Accordingly, the contact management unit 17 deletes the information from the backup request 22*a*.

Here, when the contact ID 18*b* is changed with the change of the secret attribute 18*e*, the contact management unit 17 performs the change and also performs the operation of deleting the contact identified by the contact ID 18*b* before the change and the operation of adding the contact identified by the contact ID 18*b* after the change.

Next, it is assumed that the name 18*c* and/or the phone number 18*d* of a contact are changed. As described above, when the contact is backed up, that is, when the secret attribute 18*e* of the contact is "OFF" or the secret mode is in the ON state, the contact management unit 17 performs the same operation as the operation of step S104 in the flowchart shown in FIG. 11 to change the backed-up information. At this time, the request is "ADD", but may be "UPDATE" as described later. When the contact is not backed up, the contact management unit 17 does not perform any operation relating to the backup operation.

Next, the contact maintenance unit 21 is activated in response to the manipulation of a predetermined key of the input unit 16 and starts its operation. Here, the manipulation of a key may be input to the contact management unit 17 and the contact maintenance unit 21 may be activated by the contact management unit 17. When the backup request 22*a* is stored, the contact maintenance unit 21 may be activated at a predetermined interval of time by the control unit 11.

The contact maintenance unit 21 sequentially reads out the backup requests 22*a* taken in order and stored in the backup request memory unit 22 and performs a backup operation in accordance with the read-out information. A communication following the operation is performed by, for example, the SyncML protocol and the backup request 22*a* is treated as a change log.

That is, the contact maintenance unit 21 performs the following operation in response to the request 22*c* of the read-out information to the first backup server device. The operation based on the request 22*c* of the read-out information to the second backup server device 22*d*, . . . are similar to the operation based on the request 22*c* to the first backup server device, except that the operation is performed to the second backup server device BK2, . . . . Accordingly, the operation based on the request 22*d* to the second backup server device, . . . will not be described.

When the request 22*c* of the read-out information to the first backup server device is "ADD", the contact maintenance unit 21 searches the contact list 18*a* for a contact identified by the contact ID 18*b* stored as the contact ID 22*b*, and transmits to the first backup server device BK1 the contact ID 18*b*, the name 18*c*, the phone number 18*d*, the secret attribute 18*e*, and the request "ADD" through the transmission and reception unit 13.

When receiving a notification which is transmitted from the first backup server device BK1 and which indicates that the request is completed through the transmission and reception unit 13, the contact maintenance unit 21 updates the request 22*c* of the read-out information to the first backup server device to "SYNCHRONIZED" and stores the updated backup request 22*a* in the backup request memory unit 22.

When the request 22*d* to the second backup server device, . . . are "SYNCHRONIZED" or no information is not written therein (indicated by "-" in FIG. 7), the updated request means that the entire request is executed by the backup server device. Accordingly, the contact maintenance unit 21 deletes the request before the update from the backup request 22*a* and stores the deleted backup request 22*a* in the backup request memory unit 22.

When the request 22*c* of the read-out information to the first backup server device is "DELETE", the contact maintenance unit 21 transmits the contact ID 22*b* and the request. "DELETE" to the first backup server device BK1 through the transmission and reception unit 13. The subsequent operation is similar to the operation when the request 22*c* to the first backup server device is "ADD" and thus description thereof will be omitted.

When a request for restoring a contact stored in the first backup server device BK1 is received in response to the manipulation of a predetermined key of the input unit 16, the contact maintenance unit 21 transmits the restoring request to the first backup server device BK1 through the transmission and reception unit 13. A communication corresponding to the restoring request is performed by, for example, the SyncML protocol.

When one or more sets of information of the contact ID, the name, the phone number, and the secret attribute transmitted from the first backup server device BK1 and a notification indicating that the request is completed are received through the transmission and reception unit 13 in response to the restoring request, the contact maintenance unit 21 stores in the contact list 18*a* a contact in which the received contact ID, name, phone number, and secret attribute are set as the contact ID 18*b*, the name 18*c*, the phone number 18*d*, and the secret attribute 18*e* set by set and stores the contact list 18*a* in the contact memory unit 18.

At the time of storing the contact, when the contact having a contact ID 18*b* equal to the received contact ID is already included in the contact list 18*a*, the contact maintenance unit 21 updates the name 18*c*, the phone number 18*d*, and the secret attribute 18*e* by the use of the received name, phone number, and secret attribute.

In response to the restoring request, all the contacts stored in the first backup server device BK1 are restored. The contact maintenance unit 21 may specify a contact ID 18*b*, request to transmit a contact stored in the first backup server device BK1, and restore the contact transmitted in response to the request.

When receiving the request for restoring the contact stored in the second backup server device BK2, . . . , the contact maintenance unit 21 performs the same operation as the operation when receiving the request for restoring the contact stored in the first backup server device BK1 by means of a communication with the second backup server device BK2, . . . , and thus description thereof will be omitted.

Although it has been described that the contact maintenance unit 21 is activated in response to the manipulation of a predetermined key of the input unit 16 to start its operation, the contact management unit 17 may activate the contact maintenance unit 21 to perform the backup operation in response to the backup request 22*a* when the information included in the contact list 18*a* is added, deleted, or changed. In addition, the control unit 11 may activate the contact maintenance unit 21 at a predetermined interval of time to perform the backup operation in response to the backup request 22*a*.

Next, an operation of the contact maintenance unit 34 of the first backup server device BK1 will be described. The contact maintenance unit 34 receives a request and other information transmitted from the mobile communication terminal device MS through the transmission and reception unit 33 and starts its operation.

When the received request is "ADD" and a set of a contact ID, a name, a phone number, and a secret attribute is received, the contact maintenance unit 34 stores in the contact list 35*a* the contact in which the received contact ID, name, phone number and secret attribute are set as a contact ID 35*c*, a name 35*d*, a phone number 35*e*, and a secret attribute 35*f* and information for uniquely identifying the mobile communication terminal device MS having transmitted the request is set as a mobile communication terminal device ID 35*b*, and stores the contact list 35*a* in the contact memory unit 35. The contact maintenance unit 34 transmits a notification, which indicates that the request is completed, to the mobile communication terminal device MS having transmitted the request through the transmission and reception unit 33.

When the received request is "DELETE" and a contact ID is received, the contact maintenance unit 34 searches the contact list 35*a* for a contact in which the received contact ID is equal to the contact ID 35*c* and the mobile communication terminal device 35*b* is equal to the information for uniquely identifying the mobile communication terminal device MS having transmitted the request and deletes the searched-out contact from the contact list 35*a*. When ending the deletion of the contact, the contact maintenance unit 34 stores the contact list 35*a* in the contact memory unit 35. Then, the contact maintenance unit 34 transmits a notification, which indicates that the request is completed, to the mobile communication terminal device MS having transmitted the request through the transmission and reception unit 33.

When the received request is a restoring request, the contact maintenance unit 34 searches the contact list 35*a* for a contact in which the mobile communication terminal device ID 35*b* is equal to the information for uniquely identifying the mobile communication terminal device MS having transmitted the request, and transmits the contact ID 35*c*, the name 35*d*, the phone number 35*e*, and the secret attribute 35*f* of the searched-out one or more contacts a notification, which indicates that the request is completed, to the mobile communication terminal device MS having transmitted the request through the transmission and reception unit 33.

The operation relating to security of information performed by the second backup server device BK2 is similar to the operation relating to security of information performed by the first backup server device BK1 and thus description thereof will be omitted.

In the above-mentioned description, the request written in the request 22*c* to the first backup server device, the request 22*d* to the second backup server device, . . . of the backup request 22*a* are one of "ADD" and "DELETE". The request may have "UPDATE". The request is used when information other than the contact ID 18*b* among the information constituting a contact is updated.

It has been described above that the request "ADD" is used at the time of updating. As for the request "DELETE", the contact management unit 17 manages the backup request 22*a* similarly. For example, when the request "UPDATE" is included in the request 22*c* to the first backup server device, the secret attribute 18*e* of a contact of which the contact ID 18*b* is equal to the corresponding contact ID 22*b* is "ON", and the secret mode is set to the OFF state, the contact management unit 17 deletes the request "UPDATE" and stores the request "DELETE."

Although it has been described above that the contact management unit 17 prepares the backup request 22*a*. A monitoring unit (not shown) for monitoring addition, deletion, and change of information in the contact list 18*a* may be the backup request 22*a* independently of the contact management unit 17.

Although it has been described above that the contact management unit 17 switches the secret mode between the ON state and the OFF state. The control unit 11 may switch and store the secret mode in response to the manipulation of a predetermined key of the input unit 16 and other units may perform operations based on the stored secret mode. When an electron mail transmission and reception unit (not shown) other than the contact management unit 17 displays or does not display a secret electronic mail stored therein depending upon the ON/OFF state of the secret mode, the control unit 11 conveniently switches the secret mode only by means of one-time manipulation of a predetermined key.

Although it has been described above that the backup operation is performed to the first backup server device BK1, the second backup server device BK2, . . . , the backup operation may be performed to any number of devices. How to distinguish and use a plurality of devices is determined by manipulating a predetermined key of the input unit 16, but may be determined depending upon the information for identifying the mobile communication terminal device MS.

It has been described that the backup operation is performed to a contact. The backup operation may be similarly applied to all the formats of information and may be modified in a variety of forms.

According to the above-embodiments, it is possible to provide a mobile communication terminal device which can perform a process of setting an operation mode of the device and a backup operation based on a kind into which information is classified.

What is claimed is:

1. A mobile communication terminal device connectable to a backup device backing up information through a communication network, the mobile communication terminal device comprising:
   an information memory unit configured to store a first information and a security information indicating whether the first information is secret or not;
   a backup request memory unit configured to store a first request for backing up identification information of the first information stored in the information memory unit and the first information in the backup device, or a second request for deleting a second information identified by the identification information with which the first information is stored in the backup device;
   a transmitting unit configured to transmit the first request or the second request to the backup device, based on the information stored in the backup request memory unit; and
   a management unit configured to store the identification information of the first information and the first request in the backup request memory unit, when the first information, of which the security information indicates that the first information is not secret, is stored in the information memory unit,
   wherein when a secret mode of the mobile communication terminal device is changed from an ON state in which both secret first information and non-secret first information are displayed, to an OFF state in which only non-secret first information is displayed, the management unit deletes the identification information from the backup request memory unit if the corresponding first information is secret.

2. The mobile communication terminal device according to claim 1, wherein the management unit does not store the identification information of the first information in the backup request memory unit when the first information of which the security information indicates that the first information is secret is stored in the information memory unit.

3. The mobile communication terminal device according to claim 1, wherein
   the mobile communication terminal device further comprises a secret control unit configured to selectively set a first mode, in which secret information, of which a security information indicates the information as secret, is treated similarly to non-secret information, of which a security information indicates the information as not secret, and set a second mode, in which the secret information is treated differently than the non-secret information, and
   the backup request memory unit is further configured to store a third request for adding new identification information of new information in the backup device, based on input by a user of the mobile communication terminal device.

4. The mobile communication terminal device according to claim 3, wherein when the secret control unit sets the first mode, the management unit stores the new identification information and the new information in the backup request memory unit.

5. The mobile communication terminal device according to claim 3, wherein when the secret control unit sets the second mode, the management unit stores the new identification information and the new information in the backup request memory unit when a security information of the new information indicates that the new information is not secret.

6. A mobile communication terminal device connectable to a backup device backing up information through a communication network, the mobile communication terminal device comprising:
   an information memory unit configured to store a first information and a security information indicating whether the first information is secret or not;
   a secret control unit configured to set a secret mode in which the first information, which is stored in the information memory unit and of which the security information indicates that the first information is secret, is treated similarly to the first information of which the security information indicates that the first information is not secret and to unlock the secret mode;
   a backup request memory unit configured to store a request for backing up identification information of the first information stored in the information memory unit and the first information in the backup device, or a request for deleting second information identified by the identification information with which the first information is stored in the backup device;
   a transmitting unit configured to transmit the request for backing up or the request for deletion to the backup device, based on the information stored in the backup request memory unit; and
   a management unit configured to store the identification information of the first information and the request for backing up in the backup request memory unit, when the secret mode is set by the secret control unit or the first information of which the security information indicates that the first information is not secret at the time of storing the first information in the information memory unit,
   wherein when the secret mode is unlocked, the management unit deletes the identification information from the backup request memory unit if the corresponding first information is secret.

7. The mobile communication terminal device according to claim 6, wherein the management unit does not store the identification information of the first information in the backup request memory unit, when the secret mode is unlocked by the secret control unit and the security information of the first information indicates that the first information is secret.

8. A mobile communication terminal device connectable to a backup device backing up information through a communication network, the mobile communication terminal device comprising:
   an information memory unit configured to store a first information and a security information indicating whether the first information is secret or not;
   a secret control unit configured to set a secret mode in which the first information, which is stored in the information memory unit and of which the security information indicates that the first information is secret, is treated similarly to the first information of which the security information indicates that the first information is not secret and to unlock the secret mode;

a backup request memory unit configured to store a request for backing up identification information of the first information stored in the information memory unit and the first information in the backup device, or a request for deleting second information identified by the identification information with which the first information is stored in the backup device;

a transmitting unit configured to transmit the request for backing up or the request for deletion to the backup device, based on the information stored in the backup request memory unit; and a management unit configured to store the identification information of the first information and the request for backing up in the backup request memory unit, when the secret mode is set by the secret control unit or the first information of which the security information indicates that the first information is not secret at the time of storing the first information in the information memory unit, wherein when the secret mode is unlocked by the secret control unit and the identification information of the first information, which is stored in the information memory unit and of which the security information indicates that the first information is secret, and the request for backing up are stored in the backup request memory unit, the management unit deletes the identification information from the backup request memory unit, and when the secret mode is unlocked by the secret control unit and the identification information of the first information, which is stored in the information memory unit and of which the security information indicates that the first information is secret, and the identification information of the first information and the request for backing up are not stored in the backup request memory unit, the management unit stores a request for deleting the identification information and the backed-up information in the backup request memory unit.

9. A mobile communication terminal device connectable to a backup device backing up information through a communication network, the mobile communication terminal device comprising:

an information memory unit configured to store a first information and a security information indicating whether the first information is secret or not;

a secret control unit configured to set a secret mode in which the first information, which is stored in the information memory unit and of which the security information indicates that the first information is secret, is treated similarly to the first information of which the security information indicates that the first information is not secret and to unlock the secret mode;

a backup request memory unit configured to store a request for backing up identification information of the first information stored in the information memory unit and the first information in the backup device, or a request for deleting second information identified by the identification information with which the first information is stored in the backup device;

a transmitting unit configured to transmit the request for backing up or the request for deletion to the backup device, based on the information stored in the backup request memory unit; and a management unit configured to store the identification information of the first information and the request for backing up in the backup request memory unit, when the secret mode is set by the secret control unit or the first information of which the security information indicates that the first information is not secret at the time of storing the first information in the information memory unit, the management unit changes the security information of the first information stored in the information memory unit from information indicating that the first information is not secret to information indicating that the first information is secret, when the secret mode is unlocked by the secret control unit and the identification information of the first information, of which the security information is changed, and the first request are stored in the backup request memory unit, the management unit deletes the identification information from the backup request memory unit, and wherein, when the secret mode is unlocked by the secret control unit and the identification information of the first information and the first request are not stored in the backup request memory unit, the management unit stores a request for deleting the identification information and the backed-up information in the backup request memory unit.

10. A mobile communication terminal device connectable to a backup device backing up information through a communication network, the mobile communication terminal device comprising:

an information memory unit configured to store a first information and a security information indicating whether the first information is secret or not;

a secret control unit configured to selectively set a first mode in which the first information, which is stored in the information memory unit and of which the security information indicates that the first information is secret, is treated similarly to the first information of which the security information indicates that the first information is not secret and a second mode of unlocking the first mode;

a backup request memory unit configured to store a request for backing up identification information of the first information stored in the information memory unit and the first information in the backup device, or a request for deleting second information identified by the identification information with which the first information is stored in the backup device;

a transmitting unit configured to transmit the request for backing up or the request for deletion to the backup device, based on the information stored in the backup request memory unit; and a management unit configured to store the identification information of the first information and the request for backing up in the backup request memory unit, when the first mode is set by the secret control unit or the security information of which the first information indicates that the first information is not secret at the time of storing the first information in the information memory unit, wherein when a secret mode is changed from the first mode to the second mode, the management unit deletes the identification information from the backup request memory unit if the corresponding first information is secret.

* * * * *

UNITED STATES PATENT AND TRADEMARK OFFICE
CERTIFICATE OF CORRECTION

| | | |
|---|---|---|
| PATENT NO. | : 8,068,811 B2 | Page 1 of 1 |
| APPLICATION NO. | : 11/495537 | |
| DATED | : November 29, 2011 | |
| INVENTOR(S) | : Takamune | |

It is certified that error appears in the above-identified patent and that said Letters Patent is hereby corrected as shown below:

On the Face Page, in Field (54), in Title, delete "MOBILE COMMUNICATION TERMINAL DEVICE" and insert -- PENDING BACKUP REQUESTS USING A SECRET MODE WITHIN A MOBILE COMMUNICATION TERMINAL DEVICE --, therefor.

In Column 1, Lines 1-2, delete "MOBILE COMMUNICATION TERMINAL DEVICE" and insert -- PENDING BACKUP REQUESTS USING A SECRET MODE WITHIN A MOBILE COMMUNICATION TERMINAL DEVICE --, therefor.

Signed and Sealed this
Seventh Day of February, 2012

David J. Kappos
*Director of the United States Patent and Trademark Office*